Patented Nov. 20, 1923.

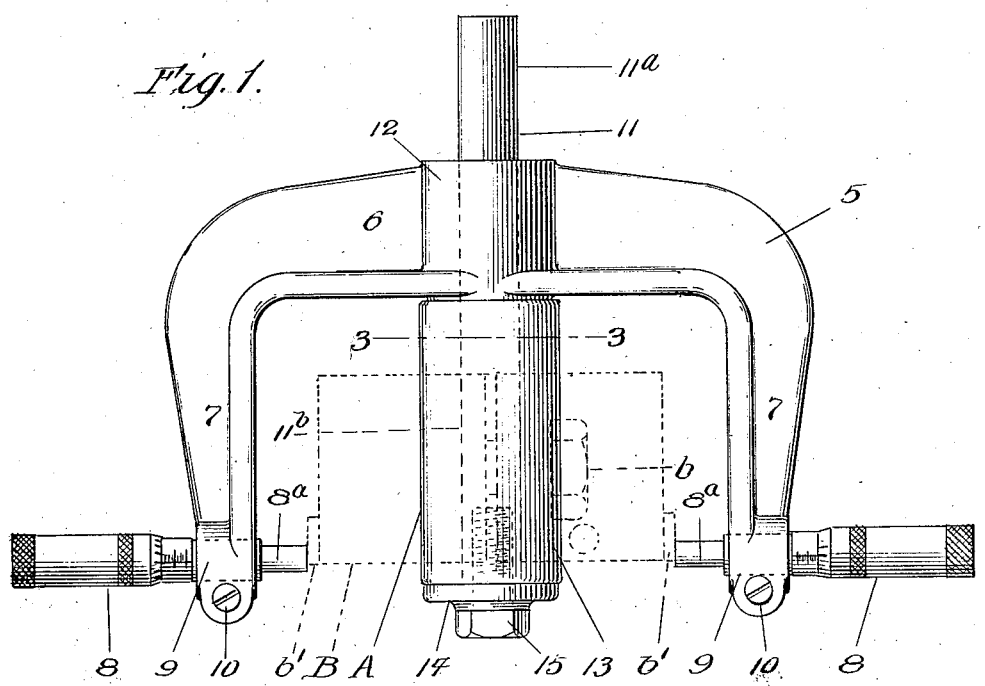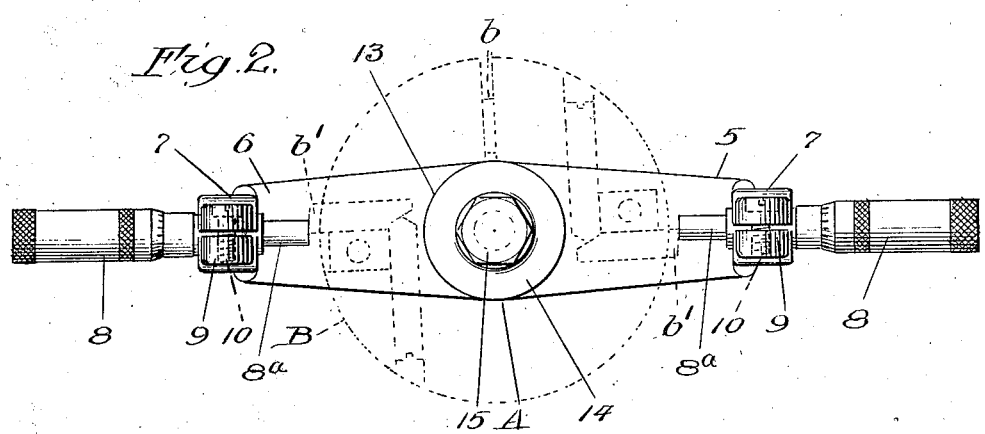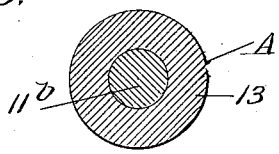

1,474,992

UNITED STATES PATENT OFFICE.

JOHN G. ZUBER, OF CHICAGO, ILLINOIS.

GAUGE.

Application filed October 4, 1922. Serial No. 592,191.

*To all whom it may concern:*

Be it known that I, JOHN G. ZUBER, a citizen of the United States, and a resident of Chicago, Cook County, and State of Illinois, have invented certain new and useful Improvements in Gauges, of which the following is declared to be a full, clear, and exact description.

This invention relates to gauges and in its present form it is intended for use in setting the cutting tools of cylinder boring or reboring machines. It is well known that when the cylinders of internal combustion engines become worn it is the practice to rebore or regrind them, and fit them with over size pistons. Work of this kind requires great precision and skill because each cylinder must be rebored to fit the piston with a few thousandths of an inch left for clearance. The present invention is embodied in a tool or instrument which can be used by more or less skilled mechanics for determining precisely the diameter of the over size piston, and transferring such dimension to the cutting tools of the boring bar head, whereby the worn cylinder may be rebored to the required size.

To such ends this invention consists in a gauge embodying a yokelike support, having a pair of aligned, spaced and oppositely disposed dimension measuring members secured therein, and a stud located midway between said members, upon which a boring bar head may be clamped, whereby the cutting tools of said head may be adjusted therein to the exact distance determined by said measuring members. The invention further consists in the several novel features hereinafter fully set forth and claimed.

This invention is clearly illustrated in the accompanying drawing, in which:

Fig. 1 is a plan of a gauge embodying a simple form of the present invention; Fig. 2 is a front elevation thereof and Fig. 3 is a detail cross section taken on line 3—3 of Fig. 1.

Referring to said drawing, the reference character 5 designates a yoke like bracket or support which in the form shown, comprises a body portion 6 from which project two arms 7, 7. These parts are preferably formed of a web or rib like structure, so as to provide a rigid support for the parts secured therein.

In the free ends of the arms 7, 7 are secured dimension measuring members 8, 8 preferably in the form of micrometer heads of common and well known construction, said measuring members 8, 8 being suitably spaced apart, and disposed opposite each other and secured in hollow split bosses 9 by set screws 10 threaded in the ears of said bosses.

Extending at right angles to said measuring members 8, and precisely midway therebetween is a stud A preferably comprising a spindle or rod 11, which is fixedly secured in a boss 12 formed on the body portion 6 of the yokelike bracket 5. If desired one end $11^a$ of the stud or shaft 11 may project to one side of the bracket to provide means whereby the device may be mounted on any suitable support. The other end $11^b$ of the spindle or shaft projects forward between the measuring members 8, and, in the form of the invention illustrated, it has a bushing or sleeve 13 rotatively mounted thereon, and a washer 14 at the end of the bushing or sleeve 13 and set screw 15 threaded in the spindle or shaft, are provided for holding the bushing or sleeve on the spindle or shaft. The bushing or sleeve 13 has a cylindrical face which is concentric with the spindle or shaft 11, and the axis of said spindle or shaft is located precisely midway between the measuring members 8. In assembling the parts great care is taken to properly locate the measuring members in the bosses 9 and fasten them in place therein. As is well understood, each micrometer head has a micrometer screw, $8^a$ which may be moved longitudinally of the barrel of the micrometer, and a scale is provided on each micrometer whereby both screws may be adjusted back and forth to bring their outer ends precisely the same distance away from the axis of the stud, and said location of the screws may be noted on the micrometer.

To use a gauge embodying the present invention for setting the cutting tools of a boring bar head, for boring out or reboring a cylinder to fit a given piston, with the proper allowance for clearance, the piston is first slipped over the stud A and the micrometer heads manipulated to bring the ends of the screws thereof, against diametrically opposite places on the opposing faces of the cylindrical part of the piston, care being taken to see that the reading on one micrometer is exactly the same as that on the other, thereby locating the ends of said micrometer screws, exactly at places equidistant from the axis of the stud. To allow for any clearance, the micrometer screws may be backed off, equally, for as much clearance as is required.

The piston is thereupon removed and a boring bar head B, such as is used for boring or reboring cylinders, is slipped upon the stud A, and clamped in place thereon by its clamp screw $b$. Its cutting tools $b^1$ are then moved outward until they contact with the ends of the micrometer screws, and are fastened in place in the head B with the usual tool clamping means. If desired, the head B may be turned half way around on the stud to reverse the position of the cutting tools and bring them into alignment with the micrometer screws, as a check to see if the tools have been properly adjusted in the head. The head is then unclamped from the stud and clamped on the boring bar of the boring machine and used in the usual manner in boring or reboring the cylinder.

From the above it is apparent that both cutting tools may be adjusted to the precise point, necessary to cut away the right amount of metal from the cylinder wall to leave a cylindrical bore of exactly the correct diameter. Moreover, with this gauge, the ordinary mechanic is able to properly set cutting tools of boring bar heads which makes it possible to perform such operations as that of reboring cylinders possible in the ordinary garages or work shops.

More or less variation as to the exact details of construction is possible without departing from the spirit of this invention; I desire, therefore, not to limit myself to the exact form of the construction shown and described, but intend, in the following claims, to point out all of the invention disclosed therein.

I claim as new and desire to secure by Letters Patent:

1. A gauge comprising a yokelike support, two similar aligned, oppositely disposed dimension measuring members secured in the arms of said support, and a cylindrical stud upon which a boring bar head may be rotatively mounted, said stud being located midway between said measuring members, and extending at right angles thereto, the axis of said stud intersecting the common axis of said measuring members.

2. A gauge comprising a yokelike support, two similar aligned, oppositely disposed micrometer heads secured in the arms of said support, and a cylindrical stud upon which a boring bar head may be rotatively mounted, said stud being located midway between said micrometer heads, and extending at right angles thereto, the axis of the stud intersecting the common axis of the micrometer heads.

3. A gauge comprising a yokelike support, two similar aligned, oppositely disposed micrometer heads secured in the arms of said support, a spindle located midway between said micrometer heads, and extending at right angles thereto, the axis of the spindle intersecting the common axis of the micrometer heads, and a cylindrical bushing rotatively mounted on said spindle, said bushing serving to rotatively support a boring bar head.

JOHN G. ZUBER.